United States Patent
Woods et al.

(10) Patent No.: US 7,116,626 B1
(45) Date of Patent: Oct. 3, 2006

(54) MICRO-POSITIONING MOVEMENT OF HOLOGRAPHIC DATA STORAGE SYSTEM COMPONENTS

(75) Inventors: Daniel D. Woods, Longmont, CO (US); Keith W. Malang, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 379 days.

(21) Appl. No.: 10/305,769

(22) Filed: Nov. 27, 2002

Related U.S. Application Data

(60) Provisional application No. 60/333,396, filed on Nov. 27, 2001.

(51) Int. Cl.
*G11B 7/00* (2006.01)

(52) U.S. Cl. ...................................... 369/103
(58) Field of Classification Search ................ 369/103, 369/126; 382/210, 302; 359/292, 15, 22
See application file for complete search history.

(56) References Cited

U.S. PATENT DOCUMENTS

| | | | |
|---|---|---|---|
| 5,719,691 A | 2/1998 | Curtis et al. | |
| 5,838,650 A * | 11/1998 | Campbell et al. | ........... 369/103 |
| 5,920,536 A | 7/1999 | Campbell et al. | |
| 5,982,513 A | 11/1999 | Zhou et al. | |
| 6,191,875 B1 | 2/2001 | Curtis et al. | |
| 6,618,185 B1 * | 9/2003 | Sandstrom | ................. 359/292 |

OTHER PUBLICATIONS

Burr, G. W. and Weiss, T. (Apr. 2000). "Compensation for Pixel Misregistration in Volume Holographic Data Storage," *Optics Letters* 26(8):542-544.

* cited by examiner

*Primary Examiner*—Nabil Hindi
(74) *Attorney, Agent, or Firm*—Morrison & Foerster LLP

(57) ABSTRACT

According to one aspect, a holographic storage system including micro-actuators is presented. In one example of one aspect of the invention, the device includes a spatial light modulator, a detector, a storage medium, and at least one micro-actuator configured to move at least one of the spatial light modulator, the detector, and the storage medium. The micro-actuators may include a servomechanism or the like to control the positioning of a component based on feedback associated with a misalignment of a detected image. According to another aspect of the invention, various methods for determining component misalignments of a holographic storage system are presented.

79 Claims, 10 Drawing Sheets

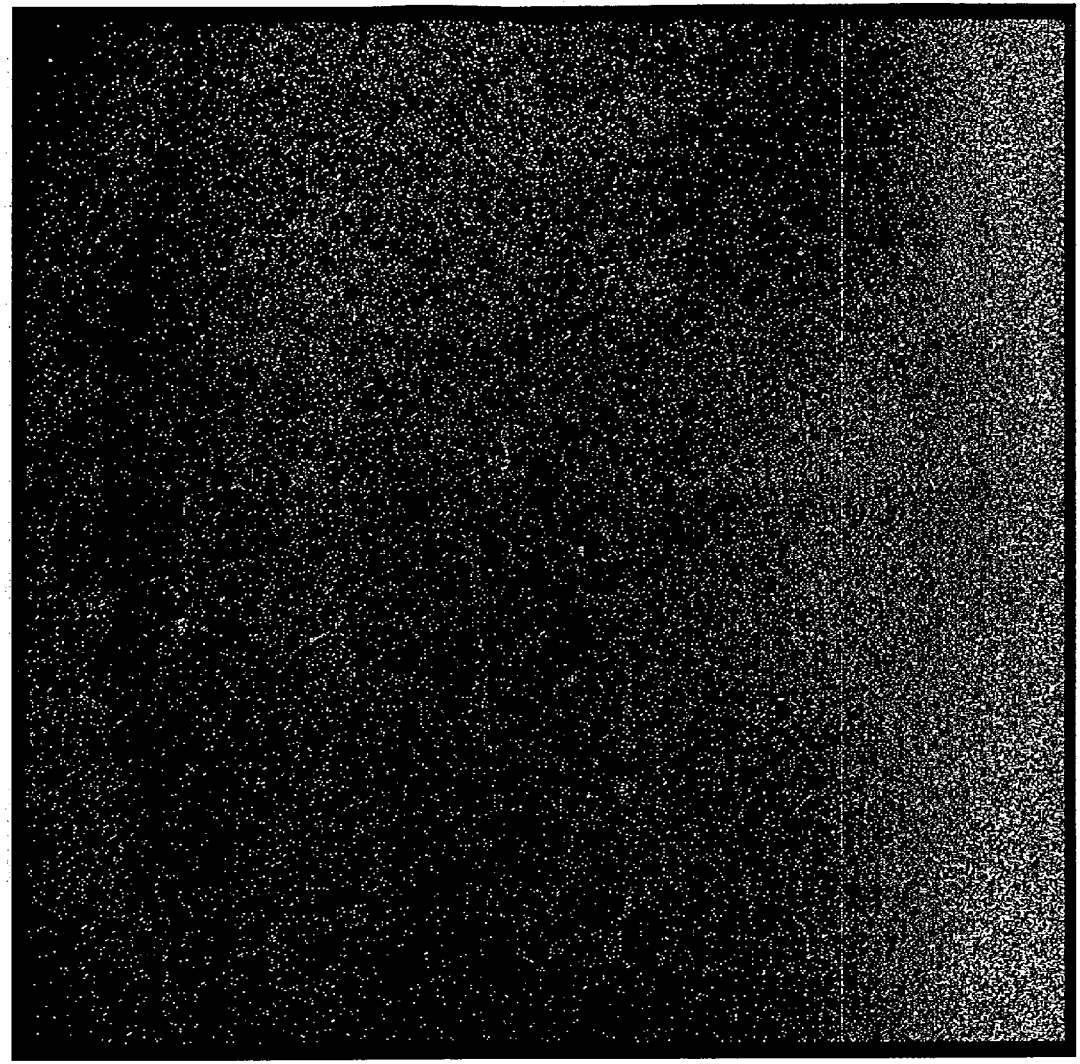

MICRO-POSITIONING MOVEMENT OF HOLOGRAPHIC DATA STORAGE SYSTEM COMPONENTS

CROSS-REFERENCE TO RELATED APPLICATIONS

The present application claims benefit of earlier filed provisional application U.S. Ser. No. 60/333,396, entitled "MICRO-POSITIONING MOVEMENT OF THE SPATIAL LIGHT MODULATOR AND CAMERA," filed on Nov. 27, 2001, which is incorporated herein in its entirety by reference.

BACKGROUND

1. Field of the Invention

The invention relates generally to holographic data storage systems, and more particularly to methods and systems for determining misalignments and positioning components in a holographic data storage system.

2. Description of the Related Art

Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal. Combining a data-encoded signal beam, referred to as an object beam, with a reference beam can create the interference pattern at the storage medium. A spatial light modulator (SLM), for example, can create the data-encoded signal beam. The interference pattern induces material alterations in the storage medium that generate the hologram. The formation of the hologram in the storage medium is a function of the relative amplitudes and polarization states of, and phase differences between, the signal beam and the reference beam. The hologram is also dependent on the wavelengths and angles at which the signal beam and the reference beam are projected into the storage medium. After a hologram is created in the storage medium, projecting the reference beam into the storage medium interacts and reconstructs the original data-encoded signal beam. The reconstructed signal beam may be detected by using a detector, such as CMOS photo-detector array or the like. The recovered data may then be decoded by the photo-detector array into the original encoded data.

In typical holographic data storage systems it is important to align the SLM, detector (i.e., a camera), and the data storage medium such that each pixel of the SLM is projected onto a single pixel of the detector. This alignment is desired for a single hologram or a group of holograms stored by various multiplexing methods including angle, shift, wavelength, correlation, spatial, aperture, phase code, and the like. It is further important to align holograms recorded in holographic medium such that, during hologram readout, each bit in the hologram image is projected onto a single pixel of the detector. Aligning the pixels of the SLM, stored holographic image, and detector is commonly referred to as "pixel matching." The objective of pixel matching is to obtain recovered images of data-containing holograms on the detector that have a low number of bits decoded in error in relation to the total bits of the data page, i.e., a low bit error rate (BER).

Performance of a holographic storage system, i.e., the quality of the modulated image, therefore depends at least in part on the alignment of various components such as the SLM with various devices, such as light sources, lenses, detectors, the storage medium, and the like. Generally the position and alignment of the SLM and other device components for reading and writing to the storage medium are mechanically set at the time of manufacturing the holographic storage system. Over time, however, the SLM, detector, or storage medium may become misaligned with various other components of the particular system. For example, temperature change, vibration, shock, and the like may result in slight movements of the detector, SLM, storage medium, or other optical components. The result may be translational, tilt, or rotational misalignment of the detector with the medium or the SLM. Further, in systems with removable storage medium, such as a rotating disk or rectangular medium, the medium may be misaligned when inserted into the system.

One strategy proposed for correcting errors arising from pixel misalignment due to improperly positioned system components is to apply image-processing techniques to the recovered hologram image. An example of such a method is described in "Compensation for Pixel Misregistration in Volume Holographic Data Storage," by G. W. Burr and T. Weiss published in Optics Letters, Vol. 26, No. 8, Apr. 15, 2001, the entire content of which is incorporated herein by reference. Another approach is to adjust or tilt the reference beam to realign the image onto the detector during a read out process. Such a method is described in U.S. Pat. No. 5,982,513 entitled "Method and System to Align Holographic Images," the entire content of which is incorporated herein by reference. Neither of the above approaches reposition components of the system and therefore have limited ability to compensate for alignment errors.

New methods and devices are therefore needed for reliably measuring and adjusting for pixel misalignments. In particular, methods and systems for moving the components of a holographic storage system, including the SLM, detector, and/or storage medium are needed. Further, methods and systems for determining the direction and magnitude of a misalignment of detected pixels, and the type of misalignment of a device component is needed.

The present invention satisfies these needs.

BRIEF SUMMARY

In one aspect of the invention, holographic storage devices including micro-actuators and methods of operating holographic storage devices are provided. In one example of one aspect of the invention, a holographic storage device includes a spatial light modulator, a detector, a storage medium, and at least one micro-actuator configured to move at least one of the spatial light modulator, the detector, and the storage medium. The micro-actuators may include a servomechanism or the like to control the positioning of a device component based on feedback associated with a misalignment of a detected image.

In another example of another aspect of the invention, a method includes detecting an image in a holographic system, determining a misalignment of the image, and activating a micro-actuator configured to position a component of the system based at least in part on feedback associated with the misalignment.

Additionally, according to other aspects of the invention, various methods are described for determining a misalignment of an image including translation, rotation, and magnification of the image. In one example, a misalignment is based on a measurement of a channel metric associated with a detected image. In another example, a misalignment is based on a measurement of a page metric associated with a detected image.

The present invention is better understood upon consideration of the detailed description below in conjunction with the accompanying drawings and claims.

DETAILED DESCRIPTION OF THE PREFERRED EMBODIMENTS

Figure 1A:
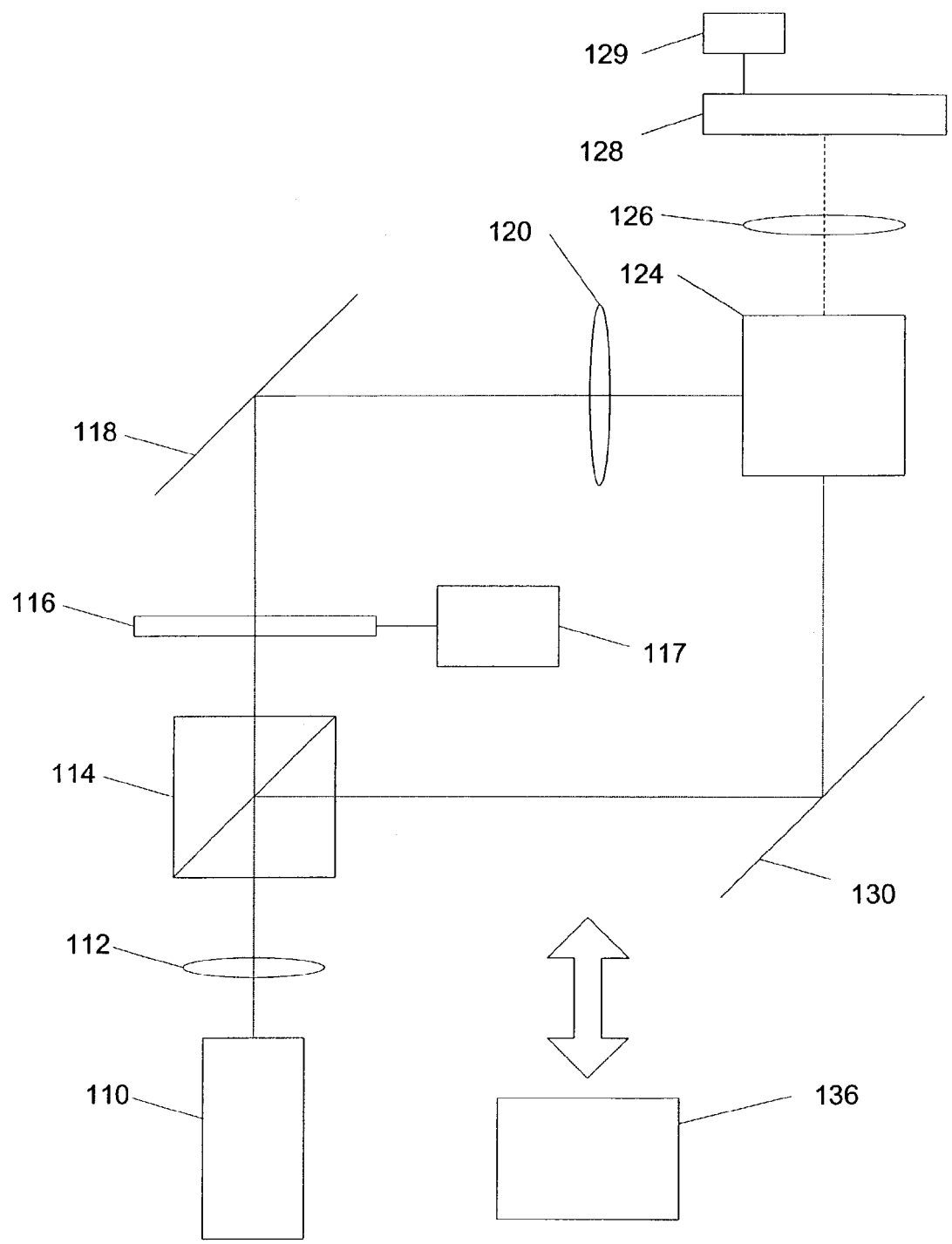
FIGS. 1A and 1B illustrate an exemplary holographic data storage system and an array of addressable elements.

Methods and systems are provided for determining image misalignments and positioning components of holographic storage systems. The following description is presented to enable any person skilled in the art to make and use the invention. Descriptions of specific techniques and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

In a holographic data storage system, the SLM is aligned with the detector (camera) during a write operation such that each pixel on the SLM is projected onto a single pixel on the detector. This alignment is important for a single hologram or a group of holograms stored by various multiplexing methods including, for example, angle, shift, wavelength, correlation, spatial, aperture, and phase code multiplexing and the like. Further, during a read operation, the medium is aligned such that holograms recorded in the storage medium are read out with each bit of the hologram image projected onto a single pixel on the detector. These alignment processes are generally referred to as "pixel matching." The objective of "pixel matching" is to obtain recovered images of data-containing holograms on the detector that have a low bit error rate (BER). Pixel misalignment may occur because one or more components of the holographic storage system are translated or rotated causing translational, tilted, rotational, magnification, or defocusing errors in the detected image. Misalignment, unless otherwise indicated, may refer to one or more of translational, tilt, rotational, magnification, or defocusing errors of the detected image.

Generally, alignment of holographic components is set at the time of manufacturing. Over time, however, the components may become misaligned due to vibrations, shocks, temperature changes, media shrinkage, and the like. The spatial extent over which stored holograms have useable signal-to-noise ratio (SNR) may be on the order of only a few microns or less. Therefore, even slight movement of the hologram based on movements of the SLM, detector, or storage medium due to mechanical error, vibration, temperature change, medium shrinkage, and the like often denigrate the performance of the holographic system. To increase SNR and the performance of the holographic system it is desirable to move or reposition components of the system to align the pixels.

Methods and systems are therefore described herein for determining the amount of pixel misalignment between the SLM and detector, or between the recorded hologram and the detector. The misalignment may be used as feedback in a servo system to move the SLM, detector, an optical element such as a lens, or holographic storage medium so as to minimize pixel misalignment. In one example, the system includes micro-actuators that are controlled by a servo-mechanism that operates to micro-position the SLM, detector, or storage medium in fine increments during an alignment process. In particular, the components of the holographic system may be positioned based on the magnitude and/or direction of the misalignment of the pixels.

In one aspect, methods are provided to measure the magnitude of pixel misalignment that may be used by a servo feedback loop to properly align various components of a holographic storage system. In systems where the components are already near the optimal positioning for pixel alignment, various measures of channel metrics, such as SNR may be determined and used for fine alignment purposes. The SNR of an image, however, may be vanishing small if the position of the medium is only a small distance from an alignment position. Thus, attempting to optimally position the medium relative to the reference beam based on a channel metric, such as SNR measurements or the like, generally requires that the relative position of the components be fairly accurate before a feedback-based search can be effective.

Further, exemplary methods include adding independent local blocks of pixels within a data page to measure local misalignments of images that may be used to directly measure image rotation, magnification, and field distortion. An image may also be encoded with known registration marks, such as a crosshair or block of pixels with known patterns, to provide a portion of the data page that is known and may be referenced. Such registration marks or patterns may be detected and the misalignment determined. The pixel misalignment may be corrected by introducing the misalignment into a servo feedback loop or the like to adjust various components of the holographic system.

Initially, an exemplary holographic storage system is described with one or more micro-actuators configured to translate linearly or to rotate components of the system including an SLM, detector, and storage medium. Additionally, various exemplary methods are described for determining misalignments of detected images. The misalignment measurements may be introduced as feedback in a servo system or the like to position components of the holographic storage system and improve performance.

I. Exemplary Holographic Storage System

FIG. 1A is a schematic illustration of an exemplary holographic storage system that includes an SLM 116 and camera or detector array 128. For example, a 1280×1024 pixel SLM coupled with a 1280×1024 pixel detector array or the like may be used. Preferably, SLM 116 and detector 128 are the same or similar size to maximize the efficiency of the components. In some applications it may be desirable to have one pixel of SLM 116 correspond to 2 or more pixels of detector 128 and vice versa.

The holographic storage system includes a light source 110, for example, a laser for providing a coherent beam of light. A beam splitter 114 is positioned to split the laser beam into an object beam and a reference beam. The object beam is directed to SLM 116 where it is encoded, for example, by an encoding unit within micro-controller 117. The object beam is encoded with data associated with a data page that creates a two-dimensional image. The signal beam, modulated with the data page image, is then directed to the recording storage material 124 by mirror 118 where it interferes with the reference beam.

Micro-controller 117 may include software and/or hardware capable of encoding data sequences into varying sized pixels by appropriately addressing the array of addressable elements. Micro-controller 117 may also encode various registration marks or known pixel patterns for determining misalignments, i.e., rotation, translation, and the like of the SLM 116, storage medium 124, or detector 128. Encoding data on SLM 116 and reading various detector array 128 pixels is well known in the art. For example, micro-controller 117 may include a decoder and/or encoder, or the like, and may address the SLM 116 and detector array 128 through firmware commands or the like.

Figure 2:
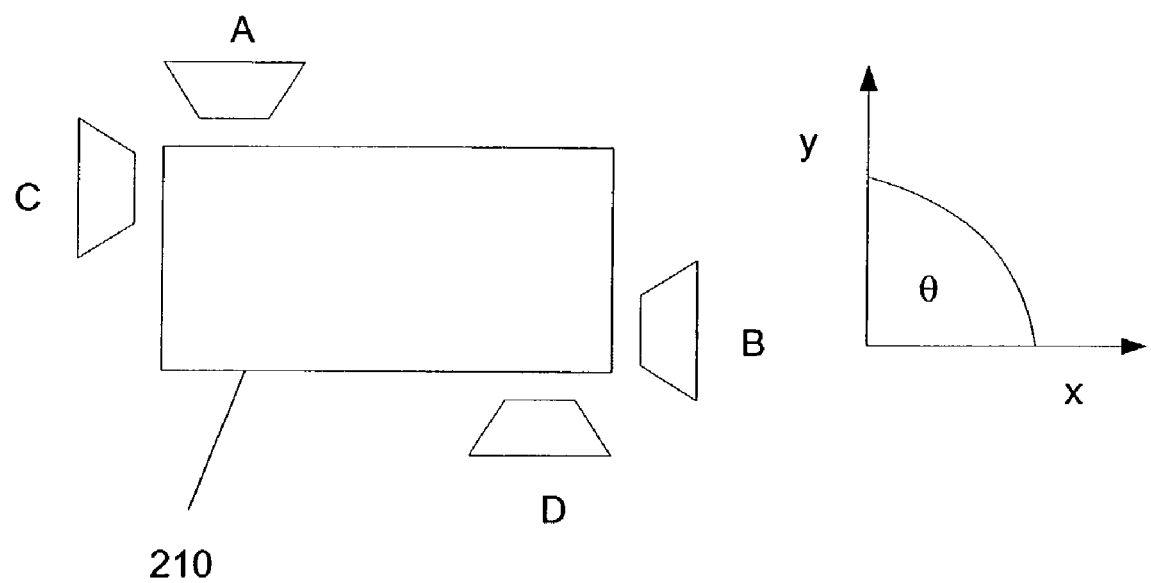
FIG. 2 illustrates a schematic representation of a holographic data storage system component including micro-actuator control elements.

Micro-controller 117 may further include a servomechanism for controlling the position of SLM 116 through one or more micro-actuators (FIG. 2). In one example, micro-actuators that are configured to move SLM 116 are coupled to a servomechanism that receives feedback signals from the detector array 128. The system may further include a microprocessor 136 that communicates with micro-controller 117 as well as other components of the system.

Figure 1B:
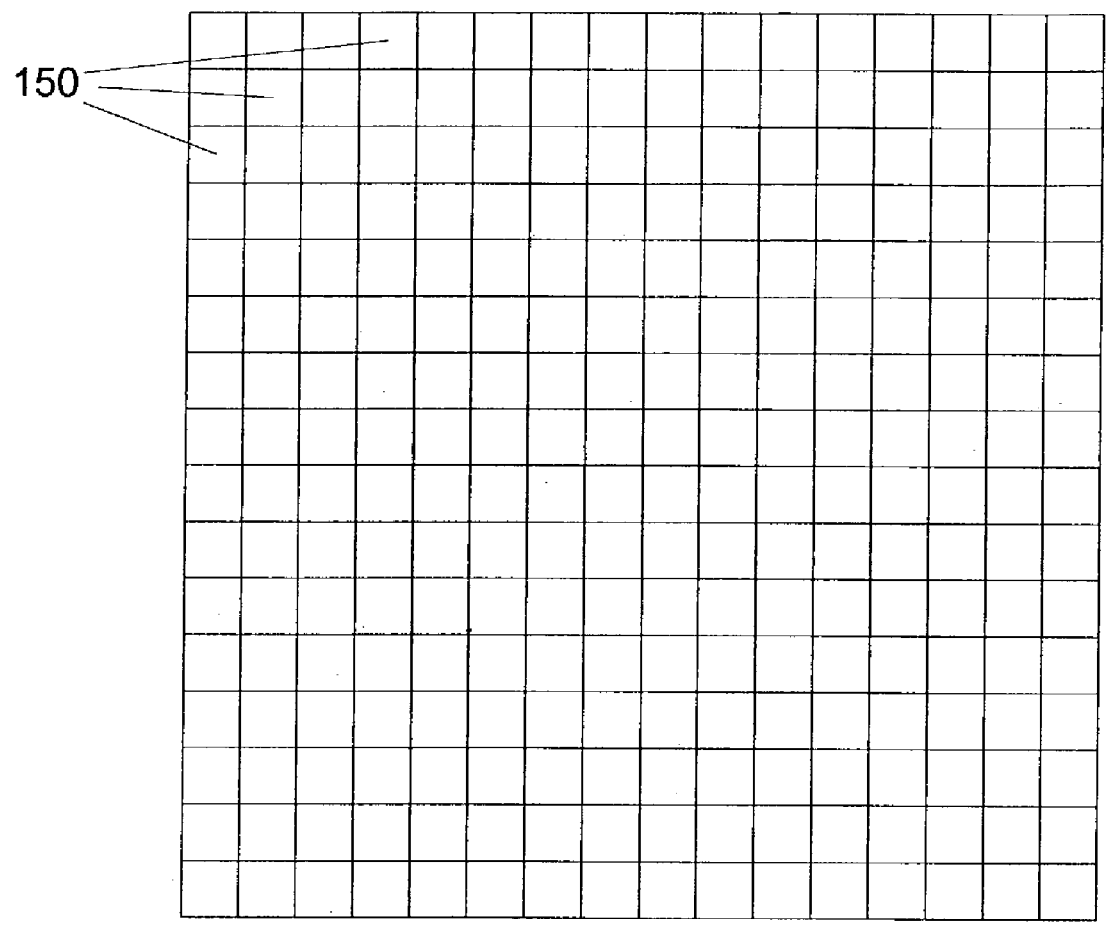

An exemplary array of pixels 150 for SLM 116 or detector array 124 (see below) is illustrated in FIG. 1B. Each pixel 150 may include a liquid crystal cell comprising a liquid crystalline material sandwiched between two electrodes and two polarizers that are rotated 90° with respect to each other. In a first state, the liquid crystal cells are transmissive to light by changing the polarization of incident light. In a second state, the liquid crystal cells are non-transmissive by allowing the incident light to pass unchanged. In some configurations, however, the cells are transmissive when allowing the light to pass unchanged and become non-transmissive by changing the polarization of the incident light. By appropriately addressing the array of pixels 150, SLM 116 modulates the object beam into a two-dimensional image or data page comprising an array of pixels 150 that may correspond to binary data units to be stored in the recording medium 124.

It should be recognized that numerous other types of SLMs 116 are possible, including reflective SLMs such as reflective LCD panels and micro-mirror devices. Reflective SLMs operate in a similar manner as transmissive SLMs, with the "on" and "off" state consisting generally of reflecting and non-reflecting states. Thus, SLM 116 may be any device capable of optically representing data in two-dimensions.

The modulated object beam encoded with data is directed towards storage medium 124 where it intersects the reference beam in the recording medium to form a complex interference pattern. The complex interference pattern is recorded in the storage medium 124. After one page of data is recorded, the storage device can be modified to enable additional pages to be recorded in storage medium 124. For example, by modifying the angle and/or wavelength of the reference beam, successive data pages can be recorded in the storage medium 124. Further, storage medium 124 may include a rotating disk of material capable of storing a hologram, where successive data pages, or stacks of data pages, are stored in different sections of the disk as it is rotated.

A particular data page may be retrieved from recording medium 124 with a reference beam similar to the original reference beam used to store the data page. The light is diffracted by storage medium 124 according to the stored hologram and the two-dimensional data page image that was stored in recording medium 124 is directed by lens 126 to photo-detector array 128. Photo-detector array 128 is, for example, an array of charge-coupled devices (CCDs) or a complementary metal-oxide-semiconductor (CMOS) detector array that captures the data page image. The data retrieved by detector array 128 corresponds to intensity values for each element of the detector array that may be converted to pixels values depending on the addressing scheme, i.e., the number of elements included within each pixel or bit of data. Micro-controller 129 receives signals from detector array 128 and may include a decoding unit that decodes the addressable elements of the array according to a specific pixel size configuration, generally, the pixel size at which the data was stored. The decoded data page may then be read by a computer or the like in a conventional manner.

Micro-controller 129 may also relay servo signals to adjust the position of various components of the system including the SLM 116, storage medium 124, and detector array 128. Micro-controller 129 may also include a servomechanism that receives feedback signals based on the detected image and adjusts the position of detector array 128.

The holographic storage system of FIG. 1A may also include micro-actuators (see FIG. 2) configured to move at least one of the SLM 116, detector 128, and recording medium 124. According to one example, micro-actuators may be controlled, for example, by micro-controller 117 or 129 through microprocessor 136. Micro-processor 136 may receive signals from detector 128 and based on a misalignment use a servo feedback loop or the like to move at least one of the SLM 116, detector 128, or recording medium 124 to increase the performance of the holographic storage device. For example, an error signal associated with a misalignment may be sent to micro-controller 117 or 129 (or a micro-controller controlling the position of storage medium 124) to activate one or more micro-actuators.

Other exemplary holographic data storage systems that may be used in conjunction with various aspects of the present invention include those described in U.S. Pat. No. 5,920,536 entitled, "Method and Apparatus for Holographic Data Storage System," U.S. Pat. No. 5,719,691, entitled, "Phase Correlation Multiplex Holography," U.S. Pat. No. 6,191,875 entitled, "Process for Holography Using Reference Beam Having Correlated Phase Content," all of which are incorporated herein by reference in their entirety.

With reference to FIG. 2, an exemplary holographic system component 210 is illustrated that may be positioned or adjusted by micro-actuators A, B, C, and D. System component 210 may include an SLM 116, detector 128, storage medium 128, or other optical element such as a lens and the like. Micro-positioning movement of component 210 may allow for factory alignment and/or field compensation due to temperature changes, shock, vibration, and the like. The component 210 is positioned via direct and differential micro-actuator control by actuators A, B, C, and D. Actuators A, B, C, and D may include any suitable micro-actuator, such as piezoelectric crystals, differential screws, micro-motors and the like. It is desired that the micro-actuators be selected to create a range of movement in the components such that fractions of a pixel may be resolved.

Lateral positioning, i.e., x-direction translation, of component 210 may be performed by activating actuator B or C to move component 210 accordingly. Transverse positioning, i.e., y-direction translation, of component 210 is accomplished by activating actuator A or D accordingly. Rotational motion, i.e., θ direction, of component 210 may be performed for clockwise rotation by activating actuators B and C together, and for rotation counter-clockwise by activating actuators A and D together.

In the case of SLM 116 or detector 128, for example, micro-actuators A–D may be configured adjacent component 210 or a mechanical structure designed to allow micro-positioning of component 210. In the case of storage medium 128, for example, micro-actuators may be configured to position a mechanical storage medium holder or the like.

It should be recognized that other configurations and numbers of actuators may be employed to move a holographic storage device component 210. For example, additional actuators may be included to translate component 210 in a z-direction or rotate component 210 around any axis. Additional actuators may also be included to position component 210 as described above, for example two or more actuators on each side of component 210. Further, in some examples, a single actuator may be used to position a component 210.

II. Exemplary Methods of Operation

1. Channel Metrics

In a holographic data storage device, alignment errors of the hologram and/or optical data path may cause misalignment of the reconstructed data page upon the image detector. Additionally, alignment errors can lead to image distortion, defocus, magnification, and other degradations of the detected image. Various methods are described for measuring pixel misalignment errors, including translation, magnification, and the like. The measured misalignment errors may be used as an error signal in a servo feedback loop to adjust components of the system thereby correcting misalignment errors.

One exemplary method includes using channel metrics as feedback into a servo system for page-level alignment of a holographic storage system. Fine adjustment of the alignment, for example, of less than one pixel, may be facilitated by feedback from a data channel to a servo loop controlling the detector or storage medium. An integrated value over the page of the channel metric provides a value indicative of the pixel alignment of the written hologram to the camera detector. By optimizing the value of the channel metric, the servo system alignment position error may be reduced or minimized.

Channel metrics generally produce scalar quantities indicating a pixel misalignment. For example, a channel metric may provide a magnitude or degree of a misalignment, but not the direction of the misalignment. Consequently, one exemplary approach to minimizing pixel registration errors using channel metrics is to move at least one of the SLM, detector, or storage medium by a small increment in one direction, and recalculate the channel metric. If the new value of the channel metric represents a greater degree of alignment than the previous value, a further step in the current direction may be taken. If the value does not represent a greater deal of alignment, however, a step in the reverse direction may be taken. This process can be continued until performance is optimized.

Exemplary channel metrics include average intensity values per page, SNR per page, bit error rate (BER) per page, the number of iterations for a decoding process, equalizer filter coefficients used as alignment feedback to the detector or SLM, as well as other suitable channel metrics. In some examples, such as SNR, BER, and the number of iterations for decoding, the metrics may be calculated for a single data page or as a running sum over multiple pages of a stack of data pages. A stack of data pages generally refers to two or more data pages at the same physical location within the storage medium.

In one example, the average pixel intensity value may be used as a channel metric. Average pixel intensity value generally refers to the amount of average illumination from each pixel, I, over all N pixels that reach the detector (camera). For example, average intensity may be given by the following expression:

$$AverageIntensity = \left(\sum_N I_N\right)/N$$

A change in the average intensity value of a data page compared to a reference data page or other data pages may indicate a misalignment of the pixels as well as the magnitude of the misalignment. The average intensity value may be used in a feedback loop to adjust components of a holographic system accordingly.

In another example, the SNR may be used as a channel metric. The SNR of a detected image generally refers to the relative value of a desired signal compared to the value of the undesired noise. This ratio may be expressed in decibels and the like. SNR may be computed over individual pixels, groups of pixels, tiles of pixels, and the like. SNR may be expressed by the following expression:

$$SNR = 20\ \log_{10}((\mu_1 - \mu_0)/(\sigma_1 + \sigma_0))$$

where
$\mu_1$ = mean value of the bright pixels
$\mu_0$ = mean value of the dark pixels
$\sigma_1$ = a standard deviation of the bright pixels
$\sigma_0$ = standard deviation of the dark pixels The SLM, detector, or storage medium may be moved incrementally in one direction and the SNR recalculated. Additional incremental steps may then be taken as described above to increase or maximize SNR.

In another example, SNR may be determined over a small group of pixels, for example, a "reserved block" of pixels including a known pattern of bright and dark pixels. A reserved block of pixels may contain predetermined pixel patterns that are independent of surrounding pixels and located at known positions within a data image. The reserved blocks are an example where SNR is computed over a small group of pixels as opposed to the entire image.

In another example, the page bit error rate (BER) may be used as a channel metric. BER generally refers to the number of bits decoded in error divided by the total bits on the data page. "Bits" may refer to either channel bits or user bits. Channel bits refer to the encoded bits on the data page that include, for example, page code overhead bits. "User bits" refers to the information or data bits stored on the data page. Depending on the context, BER may refer to either channel bits or user bits. Exemplary methods described may use BER in either context, however, to avoid system latency, the method is generally preferred for channel bits. In the case of reserved blocks, described above, "bits" refers to the known pixel patterns.

In another example, the number of decoder iterations may be used as a channel metric. The number of decoder iterations generally refers to the cycles performed by an iterative decoder to process information in the methods used to properly determine the stored information, i.e., the user bits. An iterative decoder includes a decoder where the decoding process evolves over time, i.e., the process of decoding the information requires more than one number of algorithmic cycles. In contrast, a non-iterative decoder typically makes decisions on bit values in a set amount of time, independent of SNR. Further, a non-iterative decoder has no inherent provision for obtaining lower BER by taking more processing time. Under high SNR conditions, the number of decoder iterations in an iterative decoder is generally low and under low SNR conditions the number of decoder iterations is generally high. Pixel misalignment leads to lower SNR conditions. The SNR may be restored by feeding back the number of iterations during a decoding process into a servo loop to correct the misalignment of the SLM, detector, or storage medium.

In another example, equalizer filter coefficients may be used as a channel metric. Equalizer filter coefficients generally refers to the coefficient factors in signal shaping algorithms. Some examples of signal shaping algorithms are digital and analog filters. Such filters may perform frequency and time domain shaping of the signal resulting in a modified signal that is more easily decoded. An exemplary signal shaping algorithm includes a de-blurring filter that may be used to sharpen an image of detected pixels. Signal shaping may be performed with signal shaping algorithms to enhance SNR under various conditions. These coefficients can be adaptive, thereby changing filter response with misalignment. By monitoring the change in the coefficients of the algorithms while the image processing filter is attempting to correct misalignment, the magnitude of the misalignment may be determined and used as feed back into the servo loop.

It should be noted that the channel metrics described herein are illustrative in nature, and that other channel metrics may be employed as will be recognized by those skilled in the art.

2. Page Metrics

According to another aspect of the invention, misalignments may be measured based at least in part on page metrics. Page metrics generally include known pixel patterns or registration marks, such as blocks of pixels and the like located within the user encoded data or in border regions around the user encoded data. The known pixel patterns may be detected and used to determine misalignments of various components of the holographic storage system.

According to one aspect of the invention, exemplary methods of determining misalignments and performing fine adjustments of holographic storage system components may include various pixel pattern correlation techniques. Methods may include independent local blocks of pixels within an image from which their local misalignment may be measured and used to directly measure image rotation, magnification, and field distortion. A component of the system, for example, the image detector may then be aligned using feedback from the local misalignment measurements.

Other specific component misalignments may also be determined by detecting characteristic signatures of page distortion within the image.

In one example, alignment is measured by pixel cross-correlation whereby at least a portion of a detected image is compared with at least a portion of a reference image to determine a misalignment. For example, consider a detected image, or partial detected image, represented as an M by N two-dimensional array of pixel intensities, $c(x, y)$; and a reference image of data values, $b(x, y)$. To remove D.C. components of the detected image and reference image, define $c'(x, y)=c(x,y)-\text{mean}(c(x, y))$, and $b'(x, y)=b(x, y)-\text{mean}(b(x, y))$, i.e., zero-mean versions of the images. The zero-mean versions filter out D.C. components of the signals to reduce noise, for example, to eliminate bias in the position estimate caused by autocorrelation noise. The two dimensional cross-correlation of these two functions is therefore given by:

$$(b' * c')(x, y) \equiv \sum_{u=0}^{M-1} \sum_{v=0}^{N-1} b'(u, v) c'(x+u, y+v)$$

where u, v are the integer index values which span the M by N two dimensional array of pixel values.

Each value in $b'*c'$ may be interpreted as a correlation of the reference image with detected image shifted by $x=x_0$, $y=y_0$ pixels. In the absence of noise, a detector image misaligned by $x_0$, $y_0$ pixels from the reference image will produce a maximum-valued correlation peak in the cross correlation function $b'*c'$ at values $x=x_0$, $y=y_0$. All other values of $b'*c'$ will be smaller according to the Schwartz inequality. The Schwartz inequality is a basic theorem of linear mathematics proving that the correlation between a function and a shifted copy of the function is maximized when the shift is zero. Hence, detection of the location of the peak value of $b'*c'$ serves to measure pixel misalignment. Furthermore, values of $b'*c'$ will be equal to the auto-correlation of $b'$ shifted by $x_0$, $y_0$ pixels. The reference image, b, may be configured such that the value of its autocorrelation is minimized at locations other than the peak (the "auto-correlation noise"), to maximize the detection margin. This may be accomplished in many ways; in one exemplary method the reference image b is generated by a pseudo-random binary sequence of ones and zeros. Since b' has zero-mean, the expected value of the auto-correlation noise at any location is zero. Furthermore, if b' is binary and normalized to take on only the values +1 and −1, the cross correlation may be performed using only addition and subtraction. It should be recognized that other reference images may also be used.

In another exemplary method, alignment may be measured by sub-pixel interpolation. In particular, a fractional pixel part of misalignment may be determined by interpolation between values of a cross-correlation peak that straddles multiple discrete pixel locations. An interpolation function may be derived from an estimated point spread function of the imaging system such as a simplified polynomial function or the like. For example, in an instance where the pixel misalignment $x_a$, $y_a$ is not a whole number of pixels, the correlation peak of $b'*c'$ will be spread out over neighboring locations. In the case of a perfect impulse point spread function, the intensity of the neighboring locations will vary linearly with (sub-pixel) position. More generally, the impulse point spread function of the optical system determines the ratio of intensity that will be measured versus position as the correlation peak moves from one pixel to the next. In one example, the point spread function may be assumed to have a linear roll-off such that the pixel intensity changes quadratically with position, for example:

$$pos_x = x_0 + \frac{1}{2}\sqrt{\frac{(b' * c')(x_0+1, y_0)}{(b' * c')(x_0, y_0)}},$$

where $(b'*c')(x_0, y_0)$ is the maximal value of the cross correlation, $(b'*c')(x_0+1, y_0)$ is the value of it's maximal neighbor in the x direction, and $pos_x$ is the resulting position in the x direction. The resulting position in the y direction may be obtained similarly.

In another exemplary method, alignment may be measured based on local pixel misalignment. For example, multiple partial detected and reference images may be evaluated independently of each other to determine alignment of local regions of the image. The measurements of alignment with respect to local regions of the image may be used to determine component misalignments including image rotation and magnification errors.

Implementation of this exemplary method generally requires foreknowledge of the reference image, b(x, y), which is not generally known. If a local portion of the image is known, however, then the method may be applied over a subset of the entire detected image, c. For example, if the recorded images contain known reserved blocks of pixel patterns (described in greater detail below) located at various positions within the image, the method may be employed to measure the x and y local pixel misalignment at each reserve block location. For example, the x and y local misalignment may be determined with reserve blocks located in two or more corners of a data page image or spaced uniformly throughout a data page (see FIG. 5). A collection of measurements based on misalignments of each reserved block represents a map of distortion or misalignment sampled at various points within the image. Collectively, these measurements may be used to determine misalignments other than simple offsets in the x and y direction of the image. For example, image rotation and magnification may be expressed by:

$$\text{rotation} = \frac{1}{n}\sum_n \frac{\Delta x_n \cos\theta_n + \Delta y_n \sin\theta_n}{r_n},$$

$$\text{magnification} = 1 + \frac{1}{n}\sum_n \frac{\Delta y_n \cos\theta_n - \Delta x_n \sin\theta_n}{r_n},$$

where $\Delta x_n$ and $\Delta y_n$ are the measured misalignments of reserve block n, $r_n$ is the length of a radius running from the center of the image (or some other rotation center of interest) to the center of the reserve block, and $\theta_n$ is the angle that this radius makes with the y-axis.

Additionally, the local alignment data may be taken as one or more vectors and used to compute an inner product with a kernel function indicating a characteristic image distortion pattern associated with an arbitrary imaging component misalignment. For example, in the case where the holography is performed with a plane-wave reference beam, diffraction theory predicts that small angular misalignments of the probe beam during read out, i.e., misalignments smaller than the Bragg selectivity of the hologram, will cause distortion in the reconstructed image. If a plane wave hologram recorded with reference and signal beams impinging at $\theta_f$ and $\theta_s$ respectively is illuminated by a probe beam at angle of $\theta_f + \Delta\theta_p$, i.e., the probe beam is misaligned by $\Delta\theta_p$ in the Bragg direction, then the angle of the reconstructed data beam is misaligned by:

$$\Delta\theta_d = \Delta\theta_p \frac{\sin\theta_f}{\sin\theta_s}$$

Since a digital data signal beam can be decomposed into a superposition of plane waves with differing $\theta_s$ values, it is apparent that the differing value of $\sin\theta_s$ at different parts of the image will cause the image to distort. If the recording is done in the Fourier plane and the y-axis is aligned with the Bragg plane, then each data pixel will produce a plane-wave signal beam component propagating at a specific $\theta_s$ such that an expected value of $\Delta y_n' = F \Delta\theta_{d,n}$ may be precomputed for every reserved block location for some arbitrary $\Delta\theta_{p0}$ (where F is the focal length of the Fourier transform lens). This set of $\Delta y_n'$ values represents a kernel function describing the image distortion that should be seen when the probe beam is misaligned. An estimate of the actual $\Delta\theta_p$ may be expressed as:

$$\Delta\hat{\theta}_p = \Delta\theta_{p0} \frac{\sum_n \Delta y_n' \Delta y_n}{\sqrt{\sum_n \Delta y_n'^2 \sum_n \Delta y_n^2}}.$$

The inner product is the numerator, and the denominator normalizes it into a correlation coefficient. In practice it will generally be desirable to include another term that removes the pure, undistorted component of the shift in the y direction. Similarly, the y shift component caused by $\Delta\theta_p$ rather than detector offset can be removed from the $\Delta y$ estimate. In general, kernel functions for component misalignments can be generated analytically, as above, or empirically.

According to another exemplary method, registration marks are used in data page images to determine misalignments of components in a holographic storage system. A data page typically includes a single hologram image of thousands to millions of pixels, where the majority of the pixels on the page represent encoded user data. Various pixel patterns and registration marks may also be displayed on the SLM to allow SLM-to-detector pixel matching, for example. The registration marks may allow misalignments in all axes to be determined as well as focus, magnification, tilt, and rotation of the various components. The misalignments may be corrected by moving at least one of the SLM, detector, and storage medium using a servo feedback loop or the like to control micro-actuators.

In one example, a set of pre-determined pixel patterns may be included within a data page to allow pixel misalignments to be measured. For example, a border of pixels that do not contain encoded user data may be positioned around the perimeter of a data page. Within this border area, specific pixel patterns may be placed to provide signals for servo feedback and alignment of the components. These patterns may include vertical and horizontal lines, checkerboards, and rectangular blocks of "ON" (bright) pixels. The rectangular blocks of "ON" pixels are typically termed "locator boxes."

Figure 3:
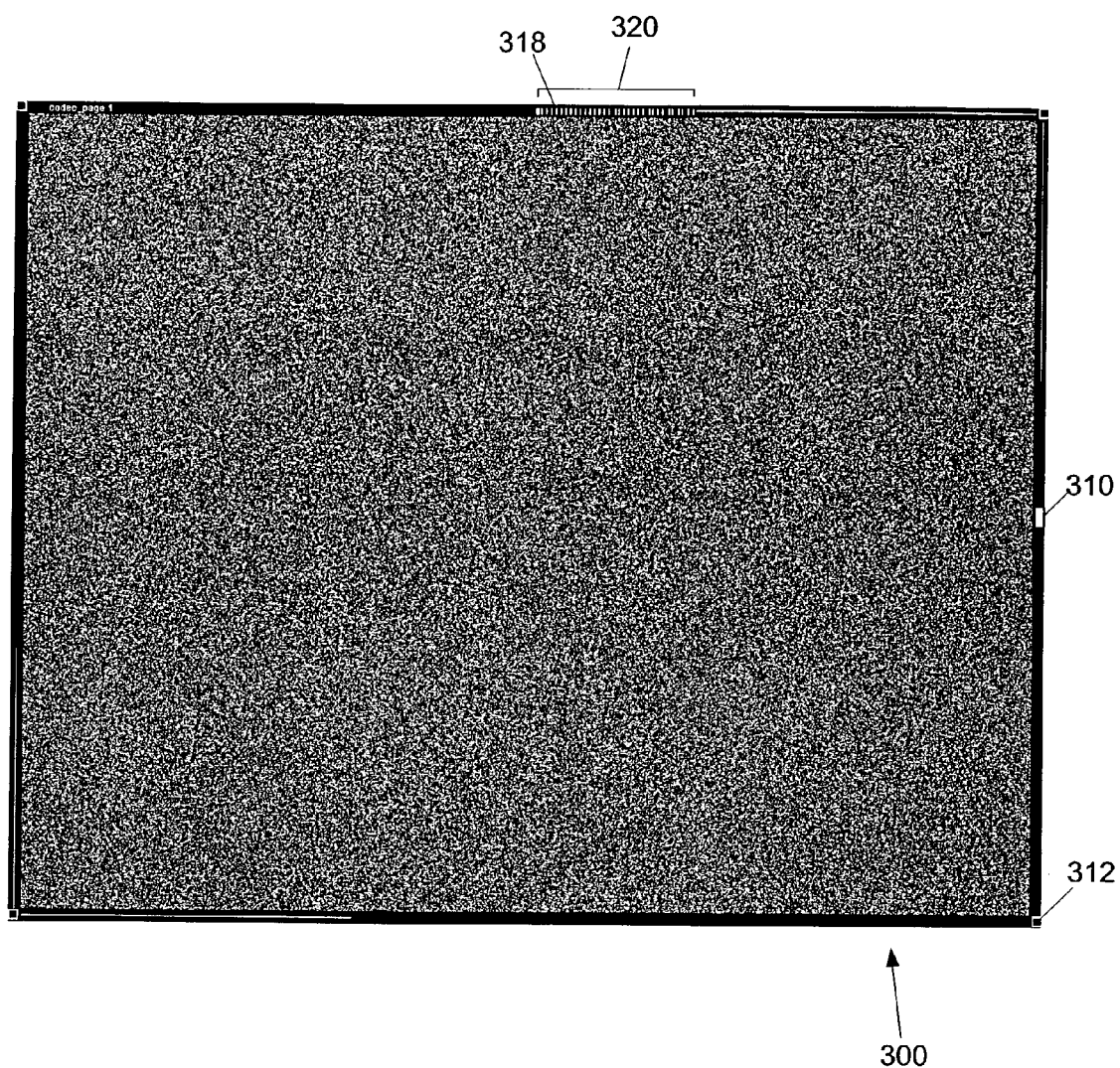
FIG. 3 illustrates an exemplary data page image including various registration marks included therein.

FIG. 3 illustrates exemplary locator boxes 310 and 312 located in the border area of data page 300. In this instance, a large locator box 310 is located on the right border of data page 300 and smaller locator boxes 312 are located in the four corners of data page 300.

Figure 6:
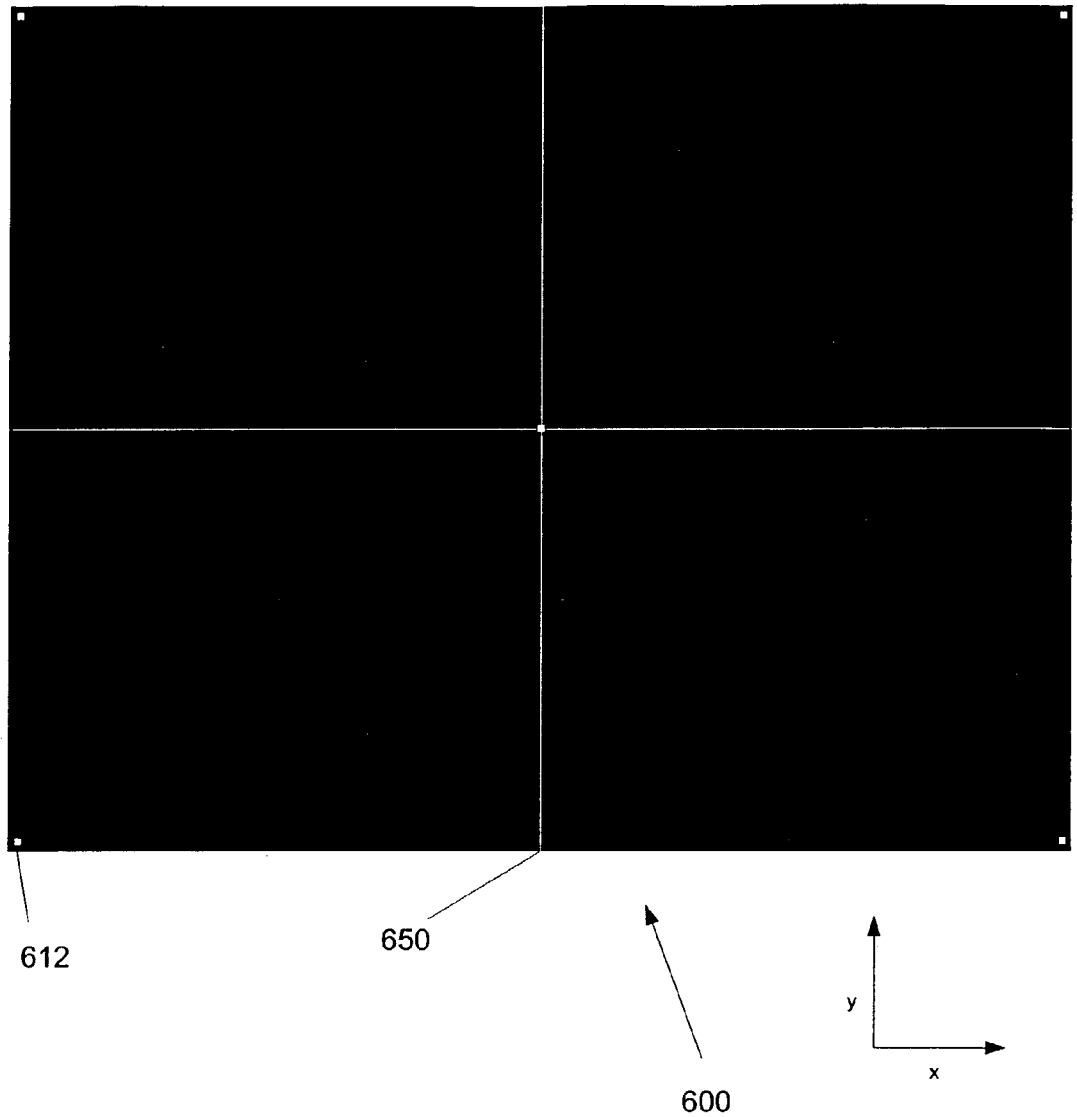
FIG. 6 illustrates an exemplary data page image including a crosshair registration mark and locator boxes.

Locator boxes are generally rectangular areas of all bright pixels. One or more may be positioned within data page 300. Locator box 310 includes an array of 24×10 pixels and locator boxes 312 include an array of 13×13 pixels. Locator boxes 310 and 312 may also be positioned within the data page. For example, as seen in FIG. 6 (described below), a locator box is located in the center of the data page.

Alignment of the SLM, detector, or storage medium may be determined with one or more locator boxes 310 and 312 because locator boxes 310 and 312 are known features within the image, i.e., their size and position are known. Locator boxes 310 and 312 generally allow for at least coarse alignment to be measured of the components by providing both a direction and magnitude of the misalignment. Error signals, provided from the one or more locator boxes placed in the recorded data image provide feedback for optimal component positioning. As described, a locator box may include a large box of bright or "on" pixels. The locator box provides a error signal with at least two desirable properties: first, the maxima of the error signal corresponds well with the maxima of the SNR as a function of relative position; and second, the peak of the signal can be detected for large misalignment errors, so that useful information on the location of the maxima may be obtained in the context of large a priori uncertainty of its location. Thus, the signal provides the direction and magnitude of the alignment.

Further, depending on the multiplexing method used, different frequencies are typically affected differently by misalignment. For example, in shift multiplexing the sensitivity to misalignment is least in the center of the hologram. When storing in the Fourier plane, the center of the hologram corresponds to low frequency content in the image. Thus, low frequency signals are generally less sensitive to alignment errors than high frequency signals. Recovering the low and high frequency components of the stored information increases the fidelity of the system.

A data image may generally be compared to a random bit map in that its spectrum is wide and relatively flat. A small alignment error may cause many of the frequency components to be in error and consequently the SNR may drop rapidly with misalignment. As an alternative to measuring overall SNR of the image, one exemplary method embeds signals that have relatively large low frequency content that will be less sensitive to alignment error than neighboring data pixels. It is preferred that the signals also have high frequency content so that resolution of faithful reproduction of high frequencies is detectable.

Figure 4:
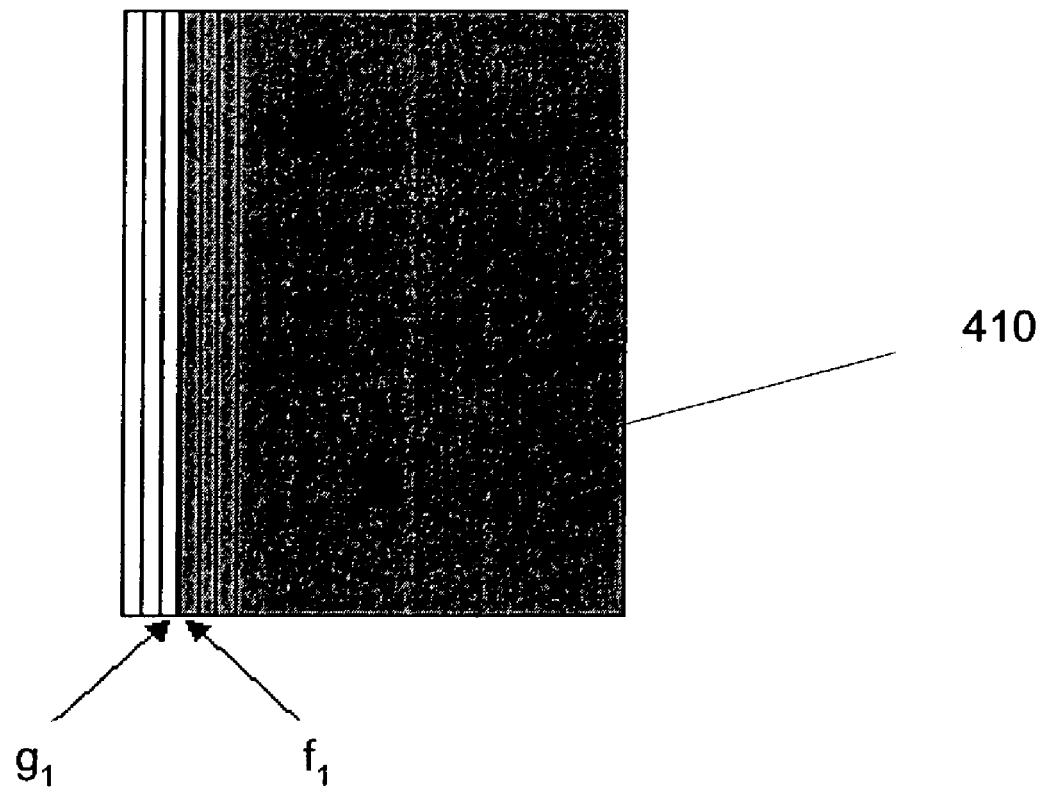
FIG. 4 illustrates an exemplary locator box that may be included in an image.

For example, with reference to FIG. 4, locator box 410 includes a large block of bright pixels providing a suitable test signal to determine alignment. The edges of the locator box 410 contain high frequency information while the overall locator box 410 provides low frequency information. By measuring the blurring of the edge perpendicular to the multiplexing direction one may obtain significant information on alignment. The sharpness of the edge correlates well with SNR in that when the edge is sharply reproduced, i.e., a well-defined edge, the SNR tends to be high. A simple measure of edge contrast has been shown to have maxima that virtually coincides with the maxima of SNR and yet the peak of the signal is broader than the corresponding SNR peak, making it highly suitable for feedback search methods. The width of the peak can be adjusted by the choice of blur calculation. For example, assume the locator box comprises a block of n by m bright pixels, where n and m are both greater than 10 and the side perpendicular to the multiplexing direction has size n. A function, f(k) may be defined as the average observed pixel intensity of an n×k sub-block in the n×m block of bright pixels that are positioned on the boundary of the block. A second function g(k), may be defined as the average observed pixel intensity of the n×k block of pixels immediately adjacent to the previous n×k block that are located outside of the locator box. The quantity f(k)–g(k) measures the blur or sharpness at the edge of the locator block. The signal has been shown to have maxima virtually coinciding with the maxima of SNR. Furthermore, the locator box signal is detectable over a wider range of pixel misalignments than the SNR. Furthermore, the range can be adjusted by the selection of k. Larger k values tend to produce broader ranges for the signal. Practical applications will typically choose k=1,2,3.

According to another exemplary method of determining alignment, a "page code" may be included within the border area of the data page. The page code may indicate the address of the particular data page and serve as a feedback for positioning various components. The page code may encode the page address using highly robust encoding schemes such that the page address can be obtained even when the pixel misalignment is so severe that no user data can be recovered from the hologram image. For example, with reference again to FIG. 3, large rectangular blocks 318 may be located near the edge to form a bar code or page code 320 that may be read despite fairly large misalignment of the image at the pixel level.

In one example, the page code 320 is encoded using an over-sampled, differential encoding scheme. The differential encoding scheme allows the page address to be obtained even when pixel misalignment is so severe that no user data can be recovered from the hologram. The page address provides the system with a source of calibration information for the servo system. For example, the page address may be used to determine the correct angle of the reference beam with respect to the storage medium and the like for reading a data page 300 corresponding to the particular page address.

The page code 320 is typically recorded in the border area of the data page and generally resembles a barcode and the like. In this instance page code 320 is recorded in the right hand half of the upper border of a data page 300, but a page code could be placed anywhere on the data page.

It is desirable that the encoding scheme is computationally efficient such that the page address may be recovered with minimal delay. A computationally efficient encoding scheme for page code 320 increases the ability of a servo feedback system to quickly read and calibrate system components. In contrast, encoding the page address with user data generally requires complex (and relatively slow) decoding schemes to recover the data with low bit error rates.

In this example, page code 320 includes a 32-bit binary page address. In an angle multiplexed holographic data storage system, for example, holograms are recorded in "stacks" of several hundred holograms, and many stacks are distributed over the surface area of the recording medium. In this instance, the 32-bit address is treated as a 16-bit stack address combined with a 16-bit hologram number within that stack.

The page address is recorded as eight identical rows of pixels. In each row, each of the 32 bits is represented by four pixels. In this particular differentially encoded scheme, each 1-bit is recorded as pixel pattern "1100" (where 1 for a pixel means a bright pixel, 0 means dark), and each 0-bit is recorded as pixel pattern "0011". Consequently, 32 pixels are used to encode each bit of the page address. Decoding the page code is simply a matter of comparing the two adjacent blocks of 16 pixels (two per row, times eight rows) that represent each address bit in this over-sampled, differential-encoding scheme. To further ameliorate the effect of blur on severely misaligned images, each four-pixel pattern may be separated by two dark pixels in each row.

One potential problem with this encoding scheme is that there may be unwanted correlations between two page codes 320 on adjacent pages 300. To mitigate such correlations, the 32-bit page address may be flipped by recording 1-bits as 0-bits and vice versa on alternating pages 300. To indicate whether the page code is on an even page address or not (and hence, whether the decoded address bits should be flipped), eight additional pixels per row may be used in the page code. For an even page address, the eight pixels are recorded as pixel pattern "11110000". For an odd page address, the pixel pattern is "00001111". Decoding whether a page address is from an even or odd page is a matter of comparing the two adjacent blocks of 32 pixels (four per row, eight rows).

It should be recognized by one skilled in the art that the decoding scheme described herein is just one of many schemes that may be used. For example, gray codes could be used in place of a simple binary address, and other schemes to reduce correlation between the page codes on adjacent pages can easily be developed. Further, page addresses of less than 32-bits will be sufficient for most holographic storage applications. Additional encoding complexity may be achieved, for example, by adding an error correction code on top of a differential-encoding scheme.

Figure 5:
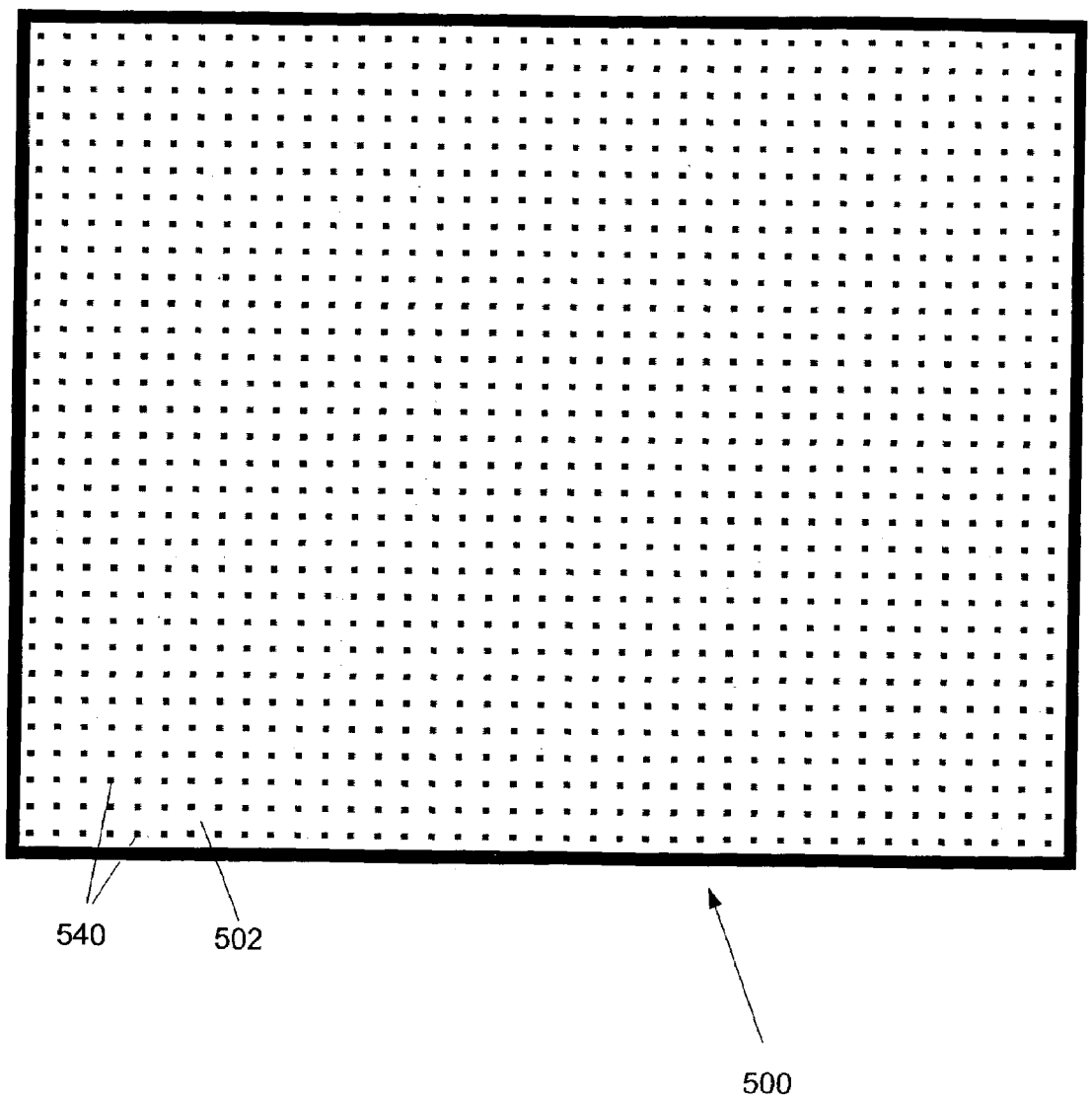
FIG. 5 illustrates an exemplary data page image including a plurality of reserved boxes therein.

With reference to FIG. 5, further registration marks, referred to as "reserved blocks" 540 may be placed within the data area 502 of data page 500. Reserved blocks 540 generally include a rectangular blocks of pixels with predetermined pixel patterns that are independent of the surrounding encoded data content. Reserved blocks may be placed at various locations dispersed throughout the data area 502.

To avoid cross-correlation of the reserved blocks 540, the reserved blocks 540 may include patterns that are different from each other across a data page 500, and different from other reserved blocks 540 located in corresponding positions of different pages 500. In a binary system, for example, the reserved blocks 540 may include pseudo-random data such that there are equal numbers of 1's and 0's in each reserved block.

A typical reserved block may be sized with 8×8 pixels. In one example, the pixel pattern for a single reserved block may be generated as follows. First, the left half of the reserved block pixels are filled with random data bits, using a random number generator seeded with a seed that is determined from the page address, for example. Second, the right half of the reserved block pixels are obtained from the left half by replacing all 1's with 0's and all 0's with 1's, then flipping the pattern horizontally and flipping the pattern vertically. Flipping the pattern horizontally and vertically is intended to remove spatial correlations; the exchange of 1's and 0's ensures that there are equal numbers of 1's and 0's in the reserved block.

The bit pattern for an exemplary 8×8 reserved block is depicted below as 1's and 0's. For clarity, the left and right halves of the reserved block are separated by a space. In practice, however, a gap is generally not placed between the pixels within the reserved block.

0010 1001
1010 0001
0111 1010
0110 1011

It should be recognized that the description of the reserved block is for illustrative purposes only and that various other methods of positioning and patterning reserved blocks are possible. As indicated above, the page code 320 may be used in conjunction with reserved blocks. In one example, the page code provides a seed for the random number generator that is used to determine the bit patterns for the reserved blocks.

In another exemplary method, alignment holograms may be used to determine misalignments. Alignment holograms, which contain little or no user data, may be interspersed between the recorded data page holograms depending on the particular application. An entire image or page area may contain specific pixel patterns to provide signals for servo alignment off the SLM, detector, or holographic medium. The same pixel patterns for determining misalignment from alignment holograms can be displayed on the SLM to allow SLM to detector pixel matching. Using alignment holograms offers the advantage of additional data space in the data page holograms.

In one exemplary method, alignment may be made using a crosshair mark or the like in an alignment hologram or SLM image. FIG. 6 illustrates an exemplary alignment page 600 that includes a centered crosshair 650. Alignment page 600 may be displayed on the SLM and the resulting image on the detector may be used to determine the amount of misalignment along the two principal axes of the detector based on the crosshair image. To determine the misalignment along the column axis, i.e., y-direction, between the SLM and detector, the sum of the intensities of the pixels in the brightest row on the image is found, together with the sum of the intensities of the pixels in the rows on either side of the brightest row. These sums are used to calculate a truncated center of mass:

$$C = \sum_{j=k-1}^{k+1} (j \cdot S_j) \Big/ \sum_{j=k-1}^{k+1} S_j,$$

where k is the row number of the brightest row and $S_j$ is the sum of the pixel intensities in row j.

The truncated center of mass value is compared to the correct value of y for the center of the columns to determine the pixel offset of the image. The center of mass calculation in this example is truncated to include only three rows in order to limit noise contributions from other portions of the data page image. The pixel offset of the image may be used to reposition the SLM or detector.

An analogous process is followed to determine the misalignment along the row axis, i.e., x-direction, using the brightest column and the columns on either side of the row axis. The calculated misalignments may be used to drive a servo controller to position the detector to the correct values. To account for any non-orthogonality between the two axes, the procedure may be repeated at the new detector positions to further refine the optimal positions for each axis.

According to another exemplary method, rotation, tip, and tilt misalignments may be determined by further including locator blocks 612 in the page 600. Locator blocks may include a group of all "ON" or bright pixels and are positioned at strategic locations of page 600. In this example, locator blocks 612 are positioned near each of the four corners and in the center of a rectangular page 600. It should be recognized locator blocks 612 may be positioned at various other configuration depending on the particular application. By calculating the local center of mass of each of these locator blocks 612, the misalignment components of rotation may be determined. Differences in blur between the five locator blocks 612 provide information on tip and tilt of the detector relative to the hologram or the SLM. Focus and magnification errors can also be determined from the center of mass of each of the five blocks 612.

The row and column misalignments as well as rotation, tip, and tilt misalignments based on the calculated errors may be corrected by moving one or more of the SLM, detector, and holographic recording medium. The procedure can be repeated at each new position to account for any non-orthogonality between the axes.

It should be recognized that misalignment may be determined based on a combination of channel metrics and page metrics. For example, channel metrics, such as BER and SNR discussed above, may also be obtained from the known pixel patterns in the reserved blocks of a data page. The channel metrics and the page metrics may be determined and used in conjunction to adjust various components and obtain pixel alignment.

According to another exemplary method, misalignments including rotation, tip, tilt, translation, or magnification may be determined with differentially encoded data pages. For example, a hologram consisting entirely of differentially encoded pixel pairs may be used to measure misalignments. A map of differential encoded pixel pairs includes patterns of differential errors across the page that are characteristic of the various misalignment errors that gave rise to them. By considering the map of differential data errors on the recovered image on the detector, estimates of misalignments due to rotation, tip, tilt, magnification, and translation, for example, may be determined.

In one exemplary differential encoding scheme, each '1' data bit is recorded as the pixel pattern "10" (where 1 indicates a bright pixel, and 0 indicates a dark pixel), and each '0' data bit is recorded as pixel pattern "01". More complex differential encoding schemes, where each user bit is represented by several pixels, may also be used. For example, the encoding schemes previously described in regard to the page code are examples of a more complex encoding schemes.

Figure 7A:
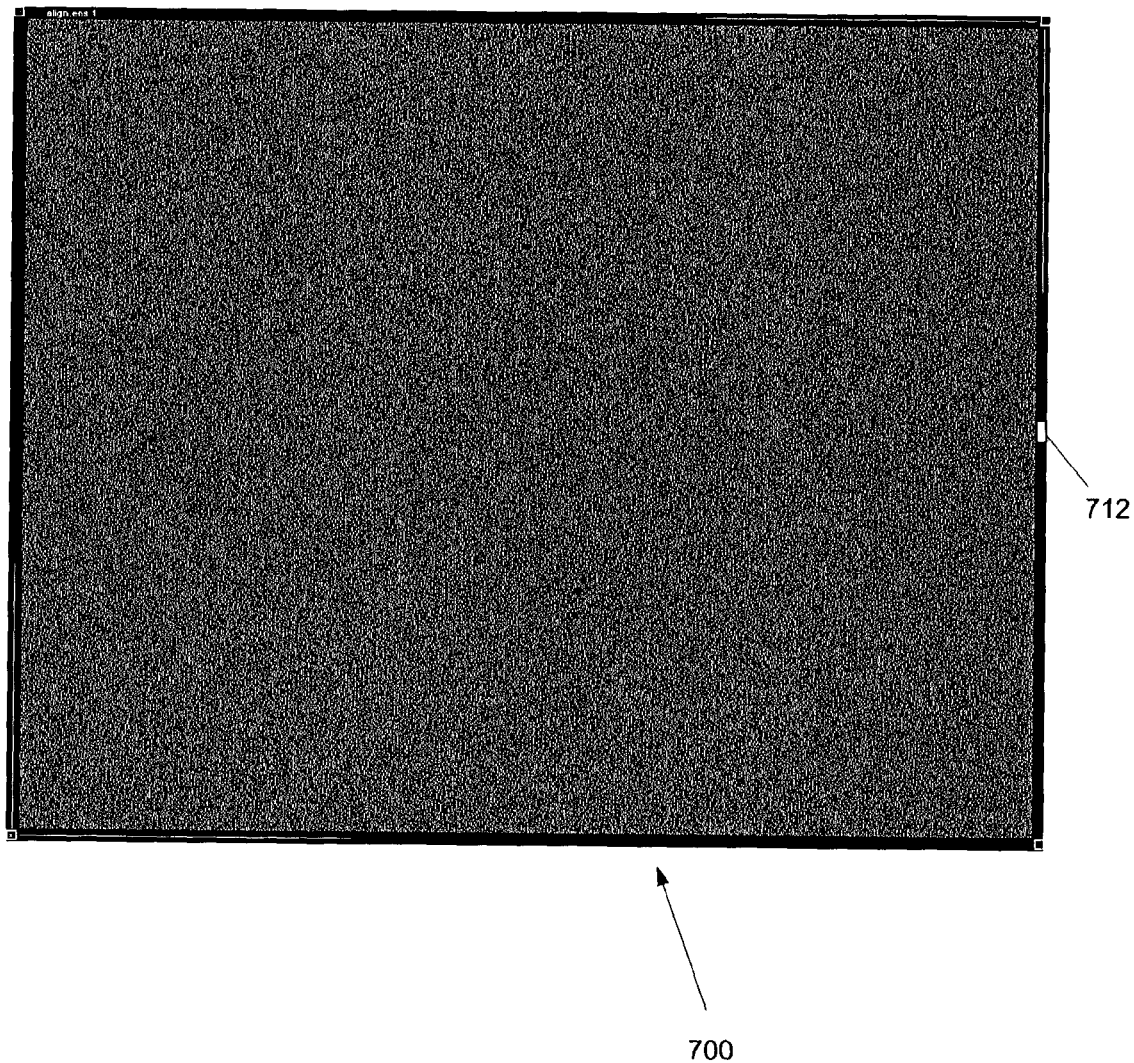
FIGS. 7A and 7B illustrate an exemplary differential encoded data page image and an error page image.

FIG. 7A illustrates an exemplary differentially encoded data page 700. For the purposes of system alignment, the differential data page 700 may be generated from random data, to produce equal numbers of 1's and 0's on the data area of the data page. The bit pattern detected by a detector may be interpreted as differential data and then compared with the original data. The image may also include locator boxes 712, as seen in the border region of data page 700. A new image, showing the positions of errors as bright pixels on the page provides a tool for alignment.

Figure 7B:

FIG. 7B shows an exemplary error page image 702 of a detected differentially encoded page compared with the original data produced from a poorly aligned holographic storage system. In this instance, it is evident from the compared error page image 702 that the right hand side of the error page image 702 is less well aligned than the left hand side as indicated by the increase in bright pixels in the right hand side region. The overall error count determined by the number of bright pixels in the image provides a metric for the misalignment.

Strategies such as those discussed above in regard to the channel metrics may be used to minimize the number of errors over the page. For example, a component of the system may be moved and the error count recalculated. Based on the new error count, the component may be moved further in the same direction or in the opposite direction to reduce the error counts. Further, characteristic patterns of distributions of the errors over the page may provide information on which axis should be moved to correct the errors.

3. Calibrating the Reference Beam and Storage Medium Position.

According to another aspect of the invention, information written to a data page hologram in a region outside the data page, may be used to identify the page address and calibrate the reference beam angle and medium positioning axes. The feature sizes and recovery techniques enable this information to be used as a source of feedback to the servo system over a wider angular range than is normally allowed in the data page recovery process. In certain implementations of holographic data storage systems, high precision steering of a beam through the medium plane is desired to access a specific data page. The repeatability and precision of steering the beam improves the generation of desirable SNR and reliable data recovery. Each desired page has an optimum angle to be recovered that relates to the proper alignment on the readout detector. The angular spacing between such data pages is generally prescribed by the choice of diffraction null used in the recording, the angle of incidence with the medium plane, and characteristics of the optical components used in the delivery of the reference beam. The optimum angle for page readout and alignment is defined by the Bragg effect, and is denoted as the Bragg matched angle. There is also a small range of incidence angles that centers on the Bragg matched angle in which there is still sufficient diffracted energy to detect the data page reliably. This range of angles forms a peak in the diffracted intensity versus incident reference beam angle plot. The peak is defined as the Bragg peak, and the small range of angles, the Bragg selectivity. The servoing of the reference beam relies upon the ability to calibrate the beam steering system to the prescribed Bragg matched angles during the readout process, and to track local storage medium tilts that might arise. Local storage medium tilts may be corrected with a small correction or adjustment such that maximum diffracted intensity is again achieved during the read process. When the angle of the steered reference beam used during read is equal to the angle of the beam used to record, light diffracted from the gratings stored in the media add up in phase and create the Bragg peak, which indicates maximum diffracted intensity, and hence the definition of the Bragg Matched angle. The width of this peak in terms of angular degrees of the incident reference beam is defined by several factors including the thickness L of the storage medium and the optimum diffraction null. It is desirable to have the servo system always operate as close as possible to the target Bragg matched angle during page readout to maximize SNR. Calibration the reference beam angle is desired so that during the write process, when there is no feedback other than via external sensor, the servo system is commanding the correct angle of the reference beam.

Figure 8:
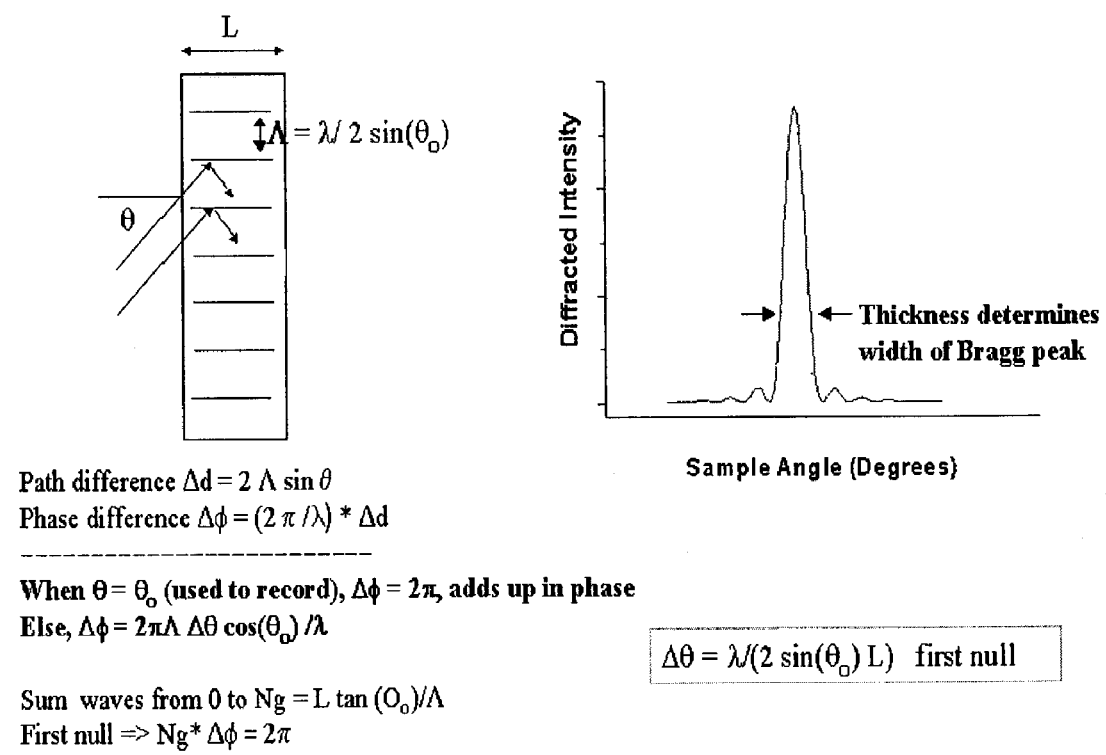
FIG. 8 illustrates an exemplary storage medium and graph of sample angle versus diffraction intensity.

For example, FIG. 8 illustrates Bragg selectivity of holograms in a holographic storage medium. For a storage medium of thickness L, wavelength of illumination $\lambda$, reference beam illumination angle of incidence $\theta_0$, the Bragg Selectivity $\Delta\theta$ of a Reconstructed Bragg peak is $\Delta\theta = \lambda/(2 \sin(\theta_0)L)$ for reconstruction around the first diffraction null. Hence, each hologram page has a specific angle that is Bragg matched, and a range of angles that describes its Bragg selectivity. The calibration of the servo system relies on measuring and storing the specific Bragg matched angle for each hologram page, and holding the reference beam within an acceptable tolerance inside of the Bragg selectivity. These angles form the position setpoint commands for the beam steering system, which may use an external angle sensor.

In one example, the angular steering of the beam includes an external angle sensor that is calibrated to prescribed Bragg matched page location angles via the use of the page code. The external angle sensor may be any suitable device or means for detecting the angle of the reference beam. An example of such a sensor includes the use of photo transmitter detector pairs that measure the absolute position of the mirror, or a mechanical feature mounted to the mirror actuator. The page code may then be used as feedback during the read and write processes. The page code feedback serves as a series of discrete addresses, and with robust decoding schemes as described herein or otherwise, may be read with a wider dynamic angular range than is normally used for recovery of the data page images.

The use of the aforementioned differential page code indicating a page address may be read from the detector and used as feedback to the servo system for beam steering and beam positioning to enable calibration. Increased speed and reliability of page-to-page accessing and angular position profiling may be achieved by calibrating system parameter constants such as beam delivery acceleration constants for use by a galvo mirror and the like. In another example, medium transport servo system constants can be calibrated.

On power up of a holographic storage system or insertion of storage medium within a system, the angular beam servo may sweep through a reference stack of page holograms and calibrate the beam acceleration constant, the external beam angle sensor, and provide the range of position setpoints or angular commands for page hologram reconstruction on the detector. The beam acceleration constant may be used by a galvo mounted mirror or the like to determine an amount of acceleration to reposition the galvo for each data page. The setpoints may also provide an initial range of command angles to target the beam-seeking servo for reliable velocity control, seek settling, and the like.

Additionally, during read operations of data pages, desired setpoints may be adaptively updated so as to track local disk tilt and/or distortions or volumetric medium shrinkage from either the holographic recording process, or from external environmental stresses caused by temperature, humidity, shock, and the like. Additionally, as an error recovery during read operations the beam servo may offset, or adjust the size of the range of acceptable angles, or monitor the magnitude and spacing of the detected page codes as an early warning of damage, wear, or degradation of the medium surface and flag the system to relocate data in these areas.

Further, in additional examples, medium axis servoing such as X and Y positioning in a Cartesian oriented medium structure, for example, a card or cube, or radial and theta servoing such as in a polar oriented medium structure, for example, a disk or cylinder, the similar methods may be used. Within various control axes, if adjacent target locations on the medium surface contain holograms including page code feedback, simple sweeping of the control axes can calibrate the axis in a similar manner for medium position setpoints, acceleration constants, and seek settle range described above. Further, these calibrations may allow for adaptive monitoring during the read process of any growth, shrinkage, or medium misalignment due to insertion or retention such as runout in disk geometry.

4. Sensing Medium Tilt Angles

According to another aspect of the invention, a method for sensing medium tilt angles and misalignments is provided. Misalignments in the medium can lead to errors in the recovered data page and degrade system performance. Misalignment information is capable of being fed back from a detector to micro-actuators that hold the medium in order to correct errors that result from incorrect medium positioning from one system to the next. For example, when medium is exchanged between two different systems it is unlikely that the tilt angles with respect to the reference beam and detector are identical. Further, the storage medium may have different tilt angles in relation to various components than it was originally recorded with. Determining which degree of freedom is in error that causes a particular misalignment is an important aspect of regenerating the hologram that was originally written. In many cases, small misalignments in storage medium, such as position, tip, and tilt, may be compensated by adjusting the camera position. However, intensity variations across the data page can occur as a result of reading the hologram at an incorrect readout angle.

In one exemplary method, medium tilt may be determined by measuring positional shifts of hologram images on the detector. In another exemplary method, the medium tilt may be determined by measuring a positional shift of a reflected beam off the medium surface. The medium tilt information that is sensed from detector images may be used as feedback to micro-actuator configured to position the medium around tilt axes to correct for misalignments.

The exemplary methods determine storage medium tilt angles in two directions orthogonal to the storage medium plane in systems where holograms are recorded near the Fourier plane. A tilt at the medium plane, e.g., linear phase modulation, will result in a translation of the image at the detector plane. A simple example of this is that a plane wave emanating or reflecting from the medium will produce a small spot at the SLM (that is thereby imaged onto the detector by the optical system) or directly on the detector plane. The amount of translation that a data page incurs can be calculated using reconstructed data as mentioned in previous aspects and examples described herein or the like. It may also be determined by measuring the position of the small spot that is generated by a plane wave reference beam reflecting off of the medium and onto the SLM where it is imaged by the detector. Therefore, when a hologram is illuminated by a reference beam at an incorrect angle caused by medium tilt, the output image shift (or spot location) may be used to determine the correction factor that needs to be applied to the medium via micro-actuators or the like thereby forming a closed feedback loop between the detector and the micro-actuators positioning or holding the storage medium.

An additional complication that may arise when calculating the medium tilt angle from a prewritten hologram is the fact that any shrinkage or bulk index change due to holographic writing will also lead to a change in output angle of the hologram. For example, even if the medium is at the correct angle with respect to the reference beam, there may be a translation in the readout hologram. In one example, however, the amount of shrinkage and bulk index change of the storage medium is determined by estimating the amount of energy that the medium has been subject to prior to measuring the medium tilt and calculating the amount of change using calibrated data from the medium manufacturer. The translation of the hologram may then be broken down into components including a translation due to shrinkage and bulk index change and a translation due to medium tilt. In this manner, medium tilt may be estimated and used in a feedback system to reorient the medium via micro-actuators or the like.

The above detailed description is provided to illustrate exemplary embodiments and is not intended to be limiting. It will be apparent to those skilled in the art that numerous modification and variations within the scope of the present invention are possible. For example, various methods of detecting alignment and/or correcting for misalignment described herein may be used in holographic storage systems in isolation or in combination with any other methods. Additionally, the apparatus and methods described herein should not be limited to any particular holographic storage system, for example, the apparatus and methods are equally applicable to read only holographic systems as well as read/write holographic systems. Accordingly, the present invention is defined by the appended claims and should not be limited by the description herein.

The invention claimed is:

1. A method for operating a holographic storage system comprising:
    detecting an image;
    determining a misalignment of the detected image; and
    activating at least one micro-actuator configured to position at least one component of the system based at least in part on the misalignment, the at least one component of the system comprising a member of the group consisting of: a detector, a storage medium, and a spatial light modulator device.

2. The method of claim 1, wherein the misalignment is characterized by at least one of translation, rotation, tilt, or magnification of the detected image relative to the detector.

3. The method of claim 1, wherein a servomechanism controls the at least one micro-actuator based on a feedback signal.

4. The method of claim 1, wherein the at least one component includes a detector.

5. The method of claim 1, wherein the at least one component includes a storage medium.

6. The method of claim 1, wherein the at least one component includes a spatial light modulator.

7. The method of claim 1, wherein the at least one component includes an optical element.

8. The method of claim 1, wherein determining the misalignment further includes the acts of measuring a channel metric associated with the image.

9. The method of claim 8, wherein the channel metric includes a measurement of at least one of average intensity, signal-to-noise ratio, page bit error rate, number of decoder iterations, and equalizer filter coefficients.

10. The method of claim 1, wherein determining the misalignment further includes the acts of measuring a page metric associated with the image.

11. The method of claim 10, wherein the page metric includes at least one of alignment holograms, page codes, registration marks, pixel cross-hairs, or pixel cross-correlation.

12. The method of claim 1, wherein the medium is encoded with alignment information.

13. The method of claim 1, wherein the medium is encoded with at least one of a locator block, a crosshair, and a reserved block.

14. The method of claim 1, wherein determining the misalignment further includes the acts of measuring pixel cross-correlation of at least a portion of the image with a reference image.

15. The method of claim 14, wherein the pixel cross-correlation produces a correlation peak associated with the misalignment.

16. The method of claim 15, wherein determining the misalignment further includes the acts of interpolating between values of the correlation peak.

17. The method of claim 16, wherein the act of interpolating includes an estimated point spread function of the system.

18. The method of claim 16, wherein the act of interpolating includes a polynomial function.

19. The method of claim 14, wherein a D.C. component of the detected image and the reference image are removed.

20. The method of claim 14, wherein a multiple of partial detected images and reference images are evaluated independently to determine misalignments of local regions of the image.

21. The method of claim 20, wherein the misalignments of local regions are used to determine at least one of image rotation and image magnification.

22. The method of claim 1, wherein determining the misalignment of the detected image includes determining the magnitude and direction of the offset.

23. The method of claim 1, wherein determining the misalignment of the detected image includes determining the magnitude of the offset.

24. The method of claim 23, further including the acts of:
    adjusting the relative position of at least one component;
    determining a second misalignment of a detected image; and
    making a second adjustment based on the second misalignment.

25. A method for operating a holographic storage system, comprising the acts of:
    providing a detector array and a storage medium;
    detecting an image stored in the storage medium with the detector array;
    determining a misalignment of the detected image with the detector array; and
    activating at least one micro-actuator for adjusting a component of the system based on the misalignment, the at least one component of the system comprising a member of the group consisting of: a detector, a storage medium, and a spatial light modulator device.

26. The method of claim 25, wherein the misalignment is characterized by at least one of translation, rotation, tilt, or magnification of the detected image.

27. The method of claim 25, further including the acts of providing a spatial light modulator, wherein the spatial light modulator encodes an object beam.

28. The method of claim 26, wherein adjusting the position of the component includes adjusting the spatial light modulator.

29. The method of claim 25, wherein the act of adjusting includes adjusting at least one of the detector and the storage medium.

30. The method of claim 29, wherein the act of adjusting a position of the component includes the acts of activating at least one micro-actuator configured to act on the component.

31. The method of claim 30, wherein the at least one micro-actuator includes a piezoelectric crystal.

32. The method of claim 25, wherein determining the misalignment further includes the acts of measuring a channel metric associated with the image.

33. The method of claim 32, wherein the channel metric includes a measurement of at least one of average intensity, signal-to-noise ratio, page bit error rate, number of decoder iterations, and equalizer filter coefficients.

34. The method of claim 25, wherein determining the misalignment further includes the acts of measuring a page metric associated with the image.

35. The method of claim 34, wherein the page metric includes at least one of alignment holograms, page codes, registration marks, pixel cross-hairs, or pixel cross-correlation.

36. The method of claim 25, wherein the image includes an alignment hologram.

37. The method of claim 25, wherein the image includes a page code.

38. The method of claim 37, wherein the page code indicates an address of the image.

39. The method of claim 37, wherein the page code is used to calibrate a servo system.

40. The method of claim 25, wherein the image includes at least one registration mark.

41. The method of claim 25, wherein the image includes a cross-hair mark.

42. The method of claim 25, wherein determining the misalignment further includes the acts of measuring pixel cross-correlation of at least a portion of the image with a reference image.

43. The method of claim 42, wherein the pixel cross-correlation produces a correlation peak indicating the misalignment.

44. The method of claim 43, wherein determining the misalignment further includes the acts of interpolating between values of the correlation peak.

45. The method of claim 44, wherein the act of interpolating includes an estimated point spread function of the system.

46. The method of claim 44, wherein the act of interpolating includes a polynomial function.

47. The method of claim 42, wherein a D.C. component of the detected image and the reference image are removed.

48. The method of claim 42, wherein a multiple of partial detected images and reference images are evaluated independently to determine misalignments of local regions of the image.

49. The method of claim 48, wherein the misalignments of local regions are used to determine at least one of image rotation and image magnification.

50. The method of claim 25, wherein determining the misalignment of the detected image includes determining the magnitude and direction of the offset.

51. The method of claim 25, wherein determining the misalignment of the detected image includes determining the magnitude of the offset.

52. The method of claim 51, further including the acts of:
adjusting the relative position of at least one component;
determining a second misalignment of a detected image; and
making a second adjustment based on the second misalignment.

53. A method for operating a holographic storage system comprising:
detecting an image;
determining a misalignment of the detected image by measuring pixel cross-correlation of at least a portion of the image with a reference image and determining a correlation peak associated with the misalignment; and
activating at least one micro-actuator configured to position at least one component of the system based at least in part on the misalignment.

54. The method of claim 53, wherein the misalignment is characterized by at least one of translation, rotation, tilt, or magnification of the detected image relative to the detector.

55. The method of claim 53, wherein a servomechanism controls the at least one micro-actuator based on a feedback signal.

56. The method of claim 53, wherein the at least one component is a detector.

57. The method of claim 53, wherein the at least one component includes a storage medium.

58. The method of claim 53, wherein the at least one component includes a spatial light modulator.

59. The method of claim 53, wherein determining the misalignment further includes the acts of measuring a page metric associated with the image.

60. The method of claim 59, wherein the page metric includes at least one of alignment holograms, page codes, registration marks, pixel cross-hairs, or pixel cross-correlation.

61. The method of claim 53, wherein the medium is encoded with alignment information.

62. The method of claim 53, wherein determining the misalignment further includes the acts of interpolating between values of the correlation peak.

63. The method of claim 62, wherein the act of interpolating includes an estimated point spread function of the system.

64. The method of claim 62, wherein the act of interpolating includes a polynomial function.

65. The method of claim 53, wherein a multiple of partial detected images and reference images are evaluated independently to determine misalignments of local regions of the image.

66. The method of claim 65, wherein the misalignments of local regions are used to determine at least one of image rotation and image magnification.

67. A method for operating a holographic storage system, comprising:
detecting an image;
determining a misalignment of the detected image; and
activating at least one micro-actuator for positioning a detector or spatial light modulator device based at least in part on the misalignment.

68. The method of claim 67, wherein a servomechanism controls the at least one micro-actuator based on a feedback signal.

69. The method of claim 67, wherein the at least one micro-actuator positions the detector.

70. The method of claim 67, wherein the at least one micro-actuator positions the storage medium.

71. The method of claim 67, wherein determining the misalignment further includes the acts of measuring a channel metric associated with the image.

72. The method of claim 67, wherein determining the misalignment further includes the acts of measuring a page metric associated with the detected image.

73. The method of claim 67, wherein the medium is encoded with alignment information.

74. The method of claim 67, wherein the medium is encoded with at least one of a locator block, a crosshair, and a reserved block.

75. The method of claim 67, wherein determining the misalignment further includes the acts of measuring pixel cross-correlation of at least a portion of the image with a reference image.

76. The method of claim 75, wherein the pixel cross-correlation produces a correlation peak associated with the misalignment.

77. The method of claim 76, wherein determining the misalignment further includes the acts of interpolating between values of the correlation peak.

78. The method of claim 67, wherein a multiple of partial detected images and reference images are evaluated independently to determine misalignments of local regions of the image.

79. The method of claim 78, wherein the misalignments of local regions are used to determine at least one of image rotation and image magnification.

\* \* \* \* \*